Nov. 20, 1956  N. D. MININBERG  2,771,365
METHOD OF MAKING BREAD FROM GRAIN KERNELS
Filed March 23, 1951  2 Sheets-Sheet 1

INVENTOR.
NATHAN D. MININBERG
BY Edwin Servol
Harry Coe
ATTORNEYS

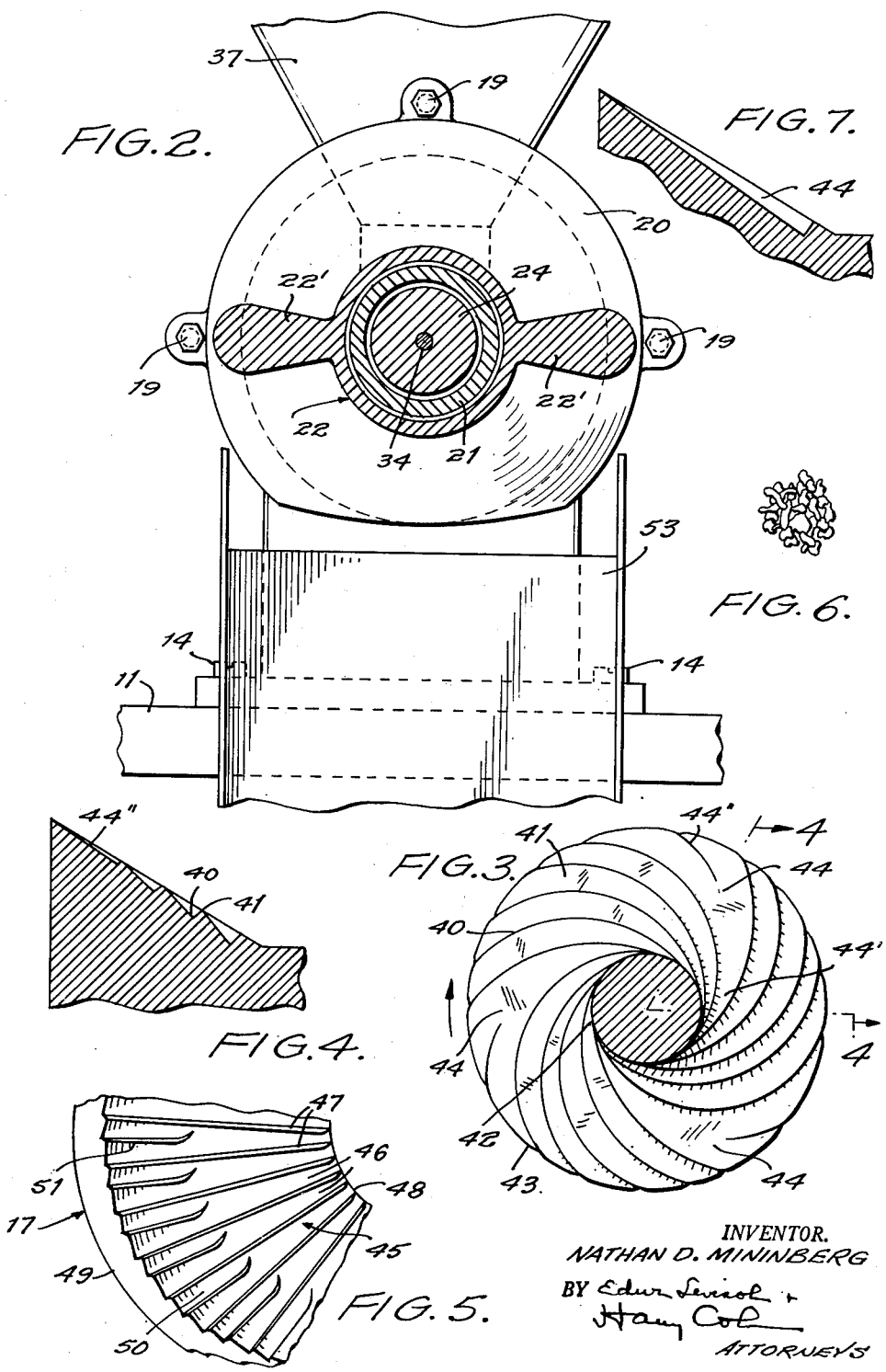

United States Patent Office 2,771,365
Patented Nov. 20, 1956

2,771,365

METHOD OF MAKING BREAD FROM GRAIN KERNELS

Nathan D. Mininberg, Stamford, Conn., assignor to Ella Mininberg, Stamford, Conn.

Application March 23, 1951, Serial No. 217,094

2 Claims. (Cl. 99—90)

This invention relates to a process and apparatus for treating grain kernels, and more particularly, to a novel manner of milling the kernels to prevent the usual loss or decomposition of the valuable food nutrient components of the grain that occurs with the use of conventional milling apparatus and processes.

In the prior art of milling grain kernels one or more operations such as grinding, pulverizing, cracking and pressing are conventionally employed to reduce the kernels to smaller particles suitable for baking and other uses. These operations involve several important disadvantages. Foremost is the fact that the grinding and similar operations produce a great amount of frictional heat which raises the temperature of the grain to a level where many of the valuable food nutrients of the grain are decomposed or otherwise destroyed. Furthermore, in conventional milling processes it is usually impractical and frequently impossible to cool the grain during grinding and similar operations so as to absorb this frictional heat, and the resulting flour product retains only a portion of the original nutritional components of the grain.

It is therefore a primary object of the present invention to reduce the rate of production of frictional heat during the milling operation by avoiding the conventional operations of grinding, pulverizing, cracking and pressing. In the present invention the grain kernels are reduced to a form suitable for baking by slicing the kernels into segments and then pressing these segments into the form of thin flakes, these slicing and flaking steps producing considerably less frictional heat than conventional grinding and other milling operations and thereby reducing the tendency of several of the nutrient components within the grain to be decomposed.

Another object of the present invention is to provide a novel process wherein the grain is cooled during the milling operation so as to absorb the frictional heat from the nutrient components and thereby prevent the latter from being decomposed or otherwise destroyed. It will thus be seen that not only is there considerably less frictional heat developed by the novel slicing and flaking steps of the present invention, but that whatever small amount of frictional heat arises is absorbed so as to maintain the grain below the decomposition temperature of the nutrients which are destroyed in conventional milling processes.

Another object is to provide an improved process of making bread, the grain flakes being a basic ingredient of the bread.

A further disadvantage of conventional grinding and other operations which reduce the kernels to a flour consisting of finely divided particles resides in the fact that the particles thus produced have different physical and chemical characteristics thereby causing particles of different types to separate out and form layers so that the mass of flour is not homogeneous. That is, it is well known that different portions or regions of each kernel have different physical characteristics such as hardness, density, texture, etc. and also different chemical compositions, particularly with respect to nutritional components. When the kernels are ground into minute particles it will be obvious that each particle is derived from a single region of the kernel and hence is endowed with the physical and chemical characteristics of that particular region so as to be dissimilar from particles derived from other regions of the kernel. This results in stratification of the flour mass into several layers each consisting of particles derived from a single portion of the kernel and each having only those food nutrients which are present in that kernel portion. For example, if one draws flour from the layer of particles derived from the core of the kernel this flour will be lacking in many of the nutrients that are present mainly in the husk.

This latter disadvantage is obviated in the present invention by slicing the kernel into segments each of which is large enough to include the material from two or more portions of the kernel. That is, a single segment may comprise both husk material and material from an inner region of the kernel. The segments thus produced by slicing are more nearly uniform as to physical and chemical characteristics than the small particles resulting from conventional grinding operations and hence stratification does not occur. Also, the segments are formed into thin curled flakes, this shape preventing relative movement of the flakes with respect to each other and thereby further reducing the tendency of the product mass to separate into different layers.

A further object of the present invention is to provide a novel apparatus for milling grain so as to produce the above-noted objects and advantages in a simple, efficient and economical manner.

Other objects and advantages are inherent in the structure and mode of operation described below and shown in the drawings wherein:

Fig. 2 is a transverse vertical sectional view taken on the line 2—2 of Fig. 1;

Fig. 3 is a transverse sectional view through the screw conveyor shaft on the line 3—3 of Fig. 1 and showing the configuration of the exterior surface of the conical milling member;

Fig. 4 is a sectional view of the milling member and taken on the line 4—4 of Fig. 3;

Fig. 5 is a partial detail view of the conical interior wall surface of the casing and shows the stepped or offset portions providing longitudinal cutting edges;

Fig. 6 shows a group of curled flakes as produced by the apparatus and process of the present invention; and Fig. 7 is a sectional view approximately as seen on the line 7—7 of Fig. 1.

Figure 1:
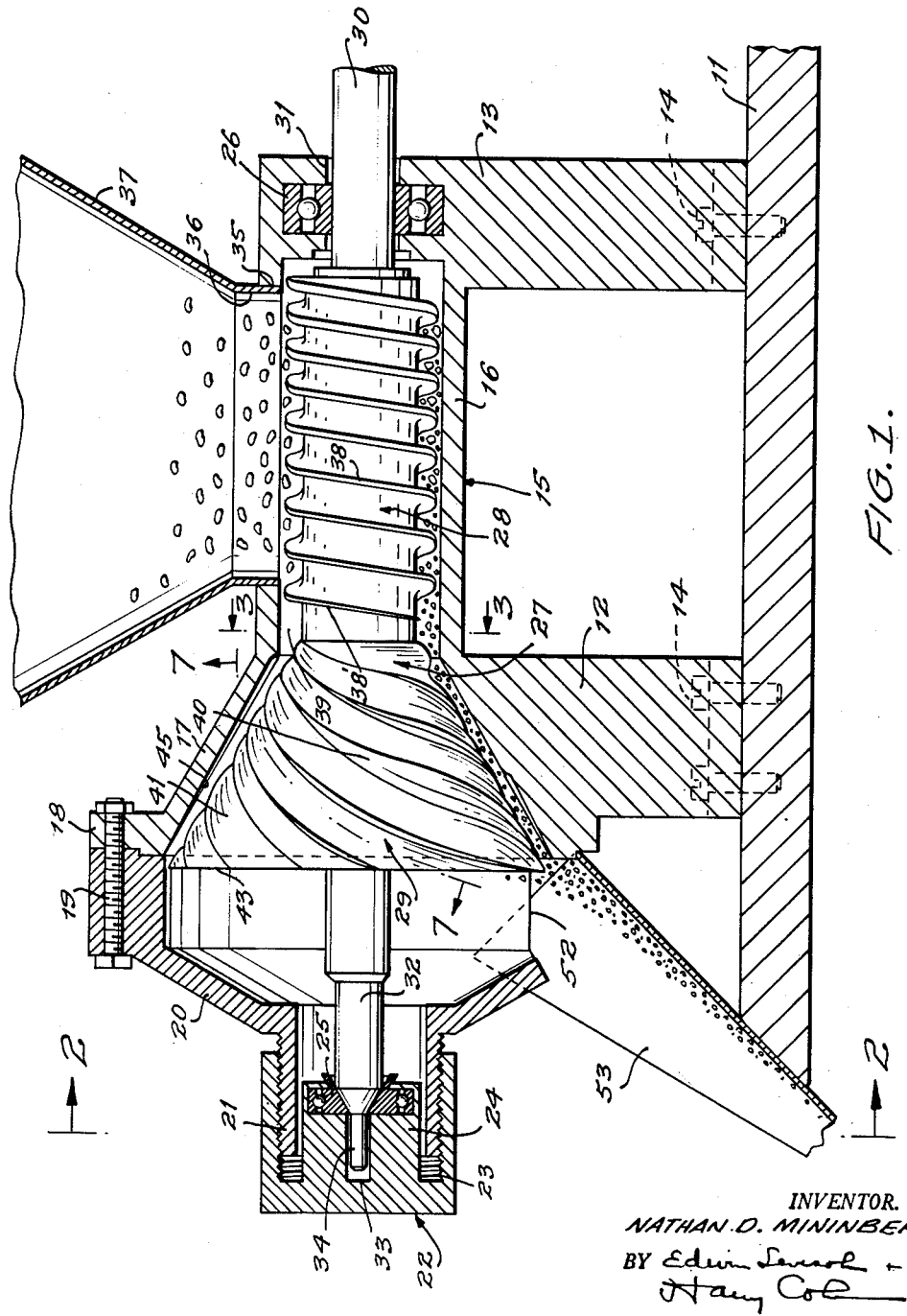
Fig. 1 is a vertical longitudinal sectional view of an apparatus embodying the present invention.

Referring now to the drawings wherein is shown one of the many forms which the apparatus of my invention may assume in practice, the reference numeral 11 indicates a horizontal base plate on which are mounted a pair of vertical supporting brackets 12, 13 secured thereto by means of screws 14. Mounted upon and extending horizontally between the upper ends of the brackets 12, 13 is a hollow female member or casing indicated generally at 15. The casing 15 comprises a cylindrical portion 16 communicating at its left-hand end with an outwardly-flaring conical portion 17.

The outer end or base of the conical casing portion 17 is provided with a plurality of lugs 18 receiving bolts for securing a housing cover 20 to the conical portion 17. The cover 20 has formed integral therewith an outwardly-projecting sleeve 21 having threads on the external surface thereof. An adjusting handle member, indicated generally at 22, is provided with an internally-threaded bore 23 for receiving and threadedly engaging the sleeve 21, and a bearing mounting lug 24 extending within sleeve 21. The end of the lug 24 has a bearing 25 mounted therein in horizontal alignment with a bearing 26 mounted in the upper end of bracket 13.

Located within the casing 15 and coaxial therewith is a male member indicated generally at 27 and comprising a screw conveyor shaft 28 extending within the casing cylindrical portion 16 and a conical milling member 29 within the casing conical portion 17. The right-hand end of the screw conveyor shaft 28 is secured to a shaft 30 rotatably mounted in bearing 26 and projecting outwardly from bracket 13 through an opening 31 in the latter, shaft 30 being connected to any suitable driving means (not shown) so as to rotate member 27 about its horizontal longitudinal axis.

While bearing 26 may be of a simple ball bearing non-thrust type, bearing 25 on lug 24 is a thrust bearing secured against sliding movement with respect to a shaft 32 on the left-hand end of the conical milling member 29. The lug 24 is provided with a recess 33 for receiving the reduced end portion 34 of the shaft 32. It will thus be seen that the male member 27 comprising screw conveyor shaft 28 and milling member 29 is rotatably mounted in bearings 25, 26 for rotation about the common longitudinal axis of male member 27 and the casing or female member 15, the latter comprising cylindrical portion 16 and conical portion 17.

The upper wall of the casing cylindrical portion 16 is provided with an opening 35 receiving the discharge end 36 of a hopper 37 for containing a supply of grain kernels to be milled. The kernels are thus fed by gravity into the annular space between the casing cylindrical portion 16 and the screw conveyor shaft 28. The latter is provided with a helical blade 38 responsive to rotation of the male member 27 to convey the grain kernels in the casing cylindrical portion 16 to the left as viewed in Fig. 1; that is, toward the casing conical portion 17 and milling member 29.

It should be noted that the pitch of the helical blade 38 increases toward the right as viewed in Fig. 1 or in a direction away from casing conical portion 17 and milling member 29. This provides for a proper distribution of the grain kernels as they are conveyed to the casing conical portion 17 and milling member 29 so as to prevent the kernels from clogging in the casing cylindrical portion, the tendency to clog being prevalent due to the fact that the kernels are preferably impregnated with a liquid coolant such as cold water before being fed to the hopper 37. It will be further noted that the left-hand end 38' of the helical blade 38 is spaced inwardly from the left-hand end of the screw conveyor shaft 28, thereby providing an enlarged annular space 39 between the conveyor shaft 28 and the adjacent interior surface of the casing cylindrical portion 16. The space 39 serves to momentarily store the kernels as a supply source from which they are drawn by the milling member 29 in a manner to be described below.

The conical exterior surface of milling member 29 is provided with a grooved or fluted configuration now to be described. As best seen in Figs. 1 and 3, said surface is formed with a plurality of spiral-like grooves 40 forming therebetween raised spiral-like flutes 41 extending from the right-hand or smaller end 42 of the milling member 29 to the larger or left-hand end 43. Also provided are three spiral-like grooves or recesses 44 of greater width than grooves 40. The grooves 44 become increasingly wider and shallower in depth as they extend from the smaller end 42 of the milling member 29 to the larger end 43 thereof. That is, the right-hand or initial portions 44' of grooves 44 are relatively narrow and deep whereas the left-hand or final portions 44" are relatively wide and shallow.

The casing conical portion 17 is provided with a conical interior wall surface 45 adapted to coact with the adjacent rotating exterior surface of the milling member 29 so as to perform various operations on the grain kernels between said surfaces. As shown in Fig. 5, the interior wall surface 45 comprises a plurality of stepped or offset portions 46 forming longitudinal shoulders or edges 47. The latter gradually decrease in depth as they extend from the entrance end 48 of casing conical portion to points adjacent the exit end 49 thereof. Each of the offset surface portions 46 is formed at its outer end with a stepped or offset area 50 adjacent the exit end 49 so as to provide additional edges 51 on said interior wall surface 45.

As the milling member 29 rotates within the casing conical portion 17 in a clockwise direction as shown by the arrow in Fig. 3, the grain kernels within the enlarged storage space 39 adjacent the entrance end 48 of the casing conical portion 17 are drawn by the right-hand or initial ends of grooves 40, 44 and flutes 41 into the space between the conical exterior surface of milling member 29 and the conical interior wall surface 45 of the casing conical portion 17. The flutes 41 rotate rapidly past the edges 47, 51 of the interior wall surface 45 and coact therewith so as to form a cutting means for slicing the grain kernels into segments.

This cutting or slicing action of edges 47, 51 and flutes 41 divides the kernels into smaller particles with the production of considerably less frictional heat than arises in conventional grinding and other kernel-dividing operations of the prior art. The reduction of frictional heat is an important advantage of the present invention because of the tendency of many of the food nutrients within the grain kernels to decompose or be otherwise destroyed when heated by friction during the prior art processes.

A further advantage of the slicing action of edges 47, 51 and flutes 41 resides in the fact that most of the kernel segments thus produced are large enough to include the material from two or more portions of the kernel, the segments being therefore more nearly uniform as to physical and chemical characteristics than the relatively small particles produced by grinding and other conventional milling operations. This uniformity of the segments tends to prevent stratification or separation of the final product into layers having different characteristics.

Due to the spiral-like configuration of the flutes 41 and grooves 40, 44, rotation of the milling member 29 serves to propel the kernels and segments from the entrance end 48 to the exit end 49 of the casing conical portion 17. The three wider grooves 44 act as storage supply spaces for the kernels and segments so as to prevent clogging of the latter, the kernels and segments being continuously ejected and fed from grooves 44 during the milling operation. The grooves 44, and particularly their outer wide shallow ends 44", serve the further functions of pressing the sliced kernel segments against the interior wall surface 45 of casing conical portion 17 so as to form them into relatively thin flakes, and also of imparting a curl to the flakes thus formed.

As shown in Fig. 1, the curled flakes are discharged from the exit end of the casing conical portion 17 through an opening 52 in the casing cover 20 and onto a chute 53. The unusual configuration of the discharged curled flakes may be seen in Fig. 6. It will be noted that this configuration causes the flakes to interlock so as to prevent relative movement with respect to each other, thereby providing further assurance that the flakes will not separate or stratify.

An important feature of the present invention comprises the step of cooling the kernels during the grinding operation so as to absorb the frictional heat which would normally tend to decompose many of the valuable food nutrient components of the grain. This is accomplished in the present invention by immersing the grain kernels into a liquid coolant, such as cold water, so that the kernels become impregnated with the water which absorbs frictional heat during the milling operation. The best results are obtained when the kernels are impregnated with about 20% of their own weight of water. Other ways of cooling the kernels during the milling operation may be employed without departing from the scope of the invention.

The clearance space between the operating surface of the milling member 29 and casing conical portion may be adjustably varied to, as to accommodate for wear, different types and sizes of grain kernels, and varying operating conditions. As seen in Fig. 2, the adjusting handle member 22 is provided with handles 22' for manual rotation of member 22 on the threaded sleeve 21, thereby enabling member 22 and also shaft 32 and milling member 29 to be adjustably moved to the left or right with respect to the conical casing portion 17 as viewed in Fig. 1, thereby adjusting the clearance distance between the conical exterior surface of milling member 29 and the conical interior wall surface 45 of the casing conical portion 17.

The flakes in the condition in which they are discharged from the milling apparatus contain about 20% more moisture than is usually present in the kernel itself. By reason of this increased moisture, it is desirable to use the flakes immediately for making bread, as storage of the moist flakes is ordinarily undesirable. The method of making bread from these moist flakes as the basic ingredient will be presently described.

It will be understood that the moist condition of the flakes is due to the water used as a coolant in the milling operation, as described above, said water having been added to the grain kernels before the latter are placed in the hopper 37 of the milling apparatus described above. However, the flakes may be used for making a dry cereal and in that case are mildly toasted at about 300° F. for about five minutes, i. e., until they are golden brown in color.

The flakes to be employed in my novel process for making bread are preferably milled from wheat kernels as explained in detail above. For each 100 pound batch of flakes about 6 pounds of fresh yeast is crumbled into small pieces and placed in a container. About 2 pounds of warm water at 95° F. is poured over the yeast and the mixture is allowed to set for ten minutes. In another container a solution of 40 pounds of warm water at 95° F. and 1½ pounds of salt is prepared, and the yeast-water mixture is stirred and strained and then dumped into the salt water solution and stirred.

The salt-water-yeast mixture is then placed in a conventional mixing machine together with the 100 pound batch of wheat flakes and mixed for about five minutes until the dough begins to thicken. A paddle or other tool is then used to remove a portion of the dough which is weighed and then placed into a greased bread pan. The top of the dough in the pan is smoothed by a suitable knife and the pan is immediately placed into a proofer for five minutes then deposited in the baking oven without delay so as to prevent the dough from rising more than ½ inch or too quickly or too high. The dough is baked in the oven at about 325° F. for fifteen minutes and then at about 375° F. for an additional forty minutes.

Another advantage of my process resides in the speed of the baking operation. It usually requires six to ten hours in conventional processes between the time of mixing the yeast with flour until the finished loaf comes out of the oven, whereas my process requires merely one hour and ten minutes to convert the wheat kernels into bread. This is due to the fact that prior art processes require considerable labor and time for fermenting and refermenting the dough, while in my process fermentation is avoided.

It is to be understood that the process and apparatus described above and shown in the drawing are merely illustrative of one of the many forms which the invention may take in practise, many variations thereof being apparent to those skilled in the art. The scope of the invention is delineated in the appended claims.

Having thus described my invention, what I claim and desire to secure by Letters Patent, is:

1. A method of making bread from grain kernels, comprising selecting sliced and flattened kernel segments in which each of the latter is composed of several of the various portions of the grain kernels so that said segments will not be characterized by the physical characteristics of any single kernel portion, adding yeast to said segments in the ratio of approximately 6 parts of yeast to 100 parts of segments by weight, adding water to the yeast and segments and mixing them to form a dough, and then initiating a baking operation before substantial fermentation of the yeast in said dough commences.

2. A method of making bread from grain kernels, comprising selecting sliced and flattened kernel segments in which each of the latter is composed of several of the various portions of said kernels so that said segments will not be characterized by the physical characteristics of any single kernel portion, preparing a salt-yeast-water mixture and adding the latter to said segments in the ratio of approximately 6 parts of yeast, 42 parts of water, and 1½ parts of salt to 100 parts of segments by weight, mixing the salt, yeast, water and segments to form a dough, and then initiating a baking operation before substantial fermentation of the yeast in said dough commences.

References Cited in the file of this patent

UNITED STATES PATENTS

| | | |
|---|---|---|
| 1,446,200 | Mulkey | Feb. 20, 1923 |
| 1,479,418 | Mininberg | Jan. 1, 1924 |
| 1,482,245 | Negro | Jan. 29, 1924 |
| 1,506,831 | Gross | Sept. 2, 1924 |
| 1,581,112 | Grelck | Apr. 20, 1926 |
| 1,916,773 | Shaler | July 4, 1933 |
| 2,009,274 | Quaschning | July 23, 1935 |
| 2,206,619 | Schreier | July 2, 1940 |
| 2,278,459 | McCashen | Apr. 7, 1942 |
| 2,358,827 | Rakowsky et al. | Sept. 26, 1944 |

OTHER REFERENCES

Lord: Everybody's Cook Book, March 1937, page 75.